United States Patent
Harrison et al.

(10) Patent No.: US 9,754,284 B2
(45) Date of Patent: Sep. 5, 2017

(54) SYSTEM AND METHOD FOR EVENT TRIGGERED SEARCH RESULTS

(71) Applicant: EXCALIBUR IP, LLC, New York, NY (US)

(72) Inventors: Beverly Harrison, Palo Alto, CA (US); Sophia Thitirat Perl, San Jose, CA (US); Tingyi Wu, Sunnyvale, CA (US); Conrad Wai, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 396 days.

(21) Appl. No.: 14/284,639

(22) Filed: May 22, 2014

(65) Prior Publication Data

US 2015/0339707 A1    Nov. 26, 2015

(51) Int. Cl.
G06F 17/30    (2006.01)
G06Q 30/02    (2012.01)

(52) U.S. Cl.
CPC ......... G06Q 30/0252 (2013.01); G06F 17/30 (2013.01); G06F 17/30864 (2013.01); G06Q 30/02 (2013.01); G06Q 30/0256 (2013.01)

(58) Field of Classification Search
CPC ............... G06Q 30/0252; G06Q 30/02; G06Q 30/0256; G06F 17/30; G06F 17/30864; G06F 30/0252; G06F 30/02; G06F 30/0256
USPC .......................................................... 707/607
See application file for complete search history.

(56) References Cited

U.S. PATENT DOCUMENTS

| | | | |
|---|---|---|---|
| 9,307,033 B1 * | 4/2016 | Meschkat | H04L 67/18 |
| 2010/0145976 A1 * | 6/2010 | Higgins | G06F 17/3064 707/765 |
| 2010/0241498 A1 * | 9/2010 | Chung | G06F 17/30893 705/14.5 |
| 2014/0222857 A1 * | 8/2014 | Chen | G06F 17/30864 707/769 |

* cited by examiner

*Primary Examiner* — Evan Aspinwall
(74) *Attorney, Agent, or Firm* — James J. DeCarlo; Greenberg Traurig, LLP (57) ABSTRACT

Disclosed is a system and method for displaying search results upon the occurrence or detection of an event and/or time-delay. The present provides a user with the ability to view search results upon satisfaction of an event trigger or specified time delay (e.g., a rule). The disclosed systems and methods enable features that allow a user to link a search query and/or a set or sets of results for the search query to a trigger, whereby upon detection and satisfaction of such trigger, the search (and/or related results) are displayed. Such trigger can be associated with, but not limited to, a calendar event, to-do list item, location, a product or contact person, among other types of event based information events.

11 Claims, 7 Drawing Sheets

SYSTEM AND METHOD FOR EVENT TRIGGERED SEARCH RESULTS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to event-based information display, and more particularly, towards systems and methods for event triggered and/or time-delayed search result display.

RELATED ART

Internet search engines identify resources that are relevant to a user's immediate query. For example, a user can enter his/her information needs and, as feedback, a search engine can provide related web pages, images, text documents, multimedia content and the like. Conventional search engines present such information about the resources immediately upon receiving an execution input responsive to the query. That is, users typically submit queries that suggest the information the users want to retrieve, and search engines immediately provide search results that are responsive to these queries.

SUMMARY

The present disclosure describes systems and methods for executing and displaying search results upon the occurrence or detection of an event and/or after a time delay. Instead of executing a query and providing search results immediately upon receiving a query from a user, as with conventional systems, the present disclosure addresses, among other shortcomings in the art, providing the user with the ability to execute or view the search results upon satisfaction of an event trigger or specified time delay, such as an external event occurrence, or a time offset from a past or future event. According to some embodiments, the systems and methods discussed herein enable a user to link a search query and/or a set or sets of results for the search query to a trigger (or otherwise to specify a time offset from such a trigger), whereby upon detection and satisfaction of such trigger, search results are displayed to the user. The search results displayed may be results from a search executed immediately after the trigger, from a search performed when the trigger was set, or from any combination or subset of one or more searches performed between when the trigger was set and the when the trigger was satisfied. Such triggers can be associated with, but not limited to, a calendar event, to-do list item, location, proximity to or interaction with a product (such as through viewing of a description of the product), or contact person (such as by a phone conversation or text message with the contact person), among other types of event based information triggers.

According to some embodiments, the display of the search results, such as, by way of non-limiting example, resources, web pages, items, descriptions and other types of content, or other such items of information, provided as a message to the user, can be provided in association with the type of event trigger. That is, for example, if the event trigger is set in accordance with a calendar event, the search results can be displayed via a displayed calendar reminder. As such, embodiments exist where event alerts are provided to users in accordance with application protocols used for providing the event alert. In some embodiments, the display of the search results can be displayed, whether or not associated with a native or third party or other application, in a browser or app window, whereby upon detection of the event trigger, a window is displayed providing the search and/or search results.

In accordance with one or more embodiments, a method is disclosed which includes receiving, at a computing device, search information and event data, said event data comprising a trigger indicating an event associated with a user; associating, via the computing device, the search information with the event data; storing, in a database, the event data; determining, via the computing device, when an external event corresponds to the event data; and based on said determination, communicating the event data to the user, said communication also facilitating communication of the search information.

In accordance with one or more embodiments, a method is disclosed which includes receiving, at a computing device, event data, said event data comprising a trigger indicating an event associated with a user; determining, via the computing device, search information based on the event data; associating, via the computing device, the search information with the event data; storing, in a database, the event data; determining, via the computing device, when an external event corresponds with the event data; and based on said determination, communicating the event data to a user, said communication also facilitating communication of the search information.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for event triggered and/or time-delayed search result display.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth or Bluetooth Low Energy (BLE), Near Field Communication (NFC), 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer including but not limited to watches or glasses, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, a search engine system can perform a search and can provide information to a user upon the user submitting a search query. In some embodiments, a search engine provides search results prior to the execution of the search query execution by auto-populating and/or detecting of search information during a user's entry of the search query/input (for example, by query rewriting). The search engine system, as a result of the input and detected topic, can identify resource(s), in some embodiments related to a topic, by causing a search to be performed. The search engine system then provides a representation of the identified resource(s) to the user. In general, conventional search systems provide search results immediately upon reception of the search query.

Mobile device users, in particular, often find themselves in situations where they want to answers questions or otherwise receive information from search results, but are at least for a time unable or unwilling to execute a search or analyze search results because such mobile users are currently in a situation that prevents or inconveniences those activities. For example, it may be difficult or impossible to perform a search or analyze search results while driving, in a meeting, or on a call. More specifically, mobile device users may be able to execute a search query on a mobile device, but be unable to review a set of results from the query until a later time. In some embodiments, as discussed in more detail below, such users may wish to review the results on another device with a display that permits a format more conducive to careful analysis or deliberation on the results, such as a laptop or large-format television display.

The present disclosure provides systems and methods that enable users to embed, link or connect (or attach or designate) search information, such as, by way of non-limiting example a search query and/or a set or sets of results for the search query, to an event alert, such as, for example, a calendar event, to-do list item, location, product, or contact person, such that the search (or related results) executes and displays in accordance with display/execution of the event trigger associated with the event alert. For example, a reminder to order flowers for a user's mom's birthday could be attached to a calendar entry for 6 pm tonight (which, for example, may be a more convenient task time for the user). At 6 pm, when the appointment occurs, the search and its results are launched and displayed to the user to take action upon. In this example, the search could be related to flowershops or e-cards. In a similar manner, as discussed in more detail below, a product, location, and/or person could trigger a search. For example, when a user arrives at a sporting event, a search for key player stats could be launched, whereby the search is triggered by detection of the event location and/or event type.

According to some embodiments, the search query can be performed prior to the event alert, and saved or buffered or cached such that upon the event occurring, the search results can be displayed in accordance with the event display. In some embodiments, the search query can be received and performed upon the event trigger occurring, such that upon the event alert display, the search query is invoked and the search is performed at the time of the event. In some embodiments, the search query can be performed prior to the event trigger, and updated (e.g., periodically according to a predetermined time period) and/or aggregated with subsequent searches until the event trigger's occurrence. Thus, for example, the search query can be updated with aggregated search and interest information from the time the search is performed until the time the search is to be displayed, i.e., the event display.

Therefore, according to some embodiments, as discussed in more detail below, search information (which can comprise a search query and/or a search result of the query) can be pre-cached for retrieval upon detection of the event trigger. According to some embodiments, the pre-caching can occur in association with a content server, web server, application server, local device, remote device, and a device/server corresponding to providing an alert responsive to the event trigger, and/or some combination thereof.

Thus, the disclosed systems and methods enable deferral of search information for later display on the same or another device. Such deferral, in some embodiments, may be based upon a user and/or search-provider configured trigger. According to embodiments of the present disclosure, triggers may be configured to anticipate when, where, why and/or how it would be most convenient for users to review search results. In some embodiments, triggered or delayed searches can result from user intent expressed in prior queries, or as a result of interaction or exposure to ads, products, locations, users, or services, or some combination thereof.

As discussed herein, triggers can be implemented through embedding or logical connection to other objects, such as, but not limited to, calendar appointments, location coordinates, special event information, or contacts, and the like. For example, respective a user's contacts, whenever communication with that person is detected or they are present at a location associated with a user, a search could be invoked; in some embodiments, the search can be based upon the interactions between the two users. The features discussed herein respective the disclosed systems and methods enable search capabilities to be integrated with other applications. For example, search capabilities can be integrated with, for example, and not limited to, location detection or route maps, calendar data, to-do list data, email, phone calls, IMs, and the like, and some combination therefore, where search results can be embedded in context to an event based on content (or user intent) derived from the integrated application(s).

Figure 1:
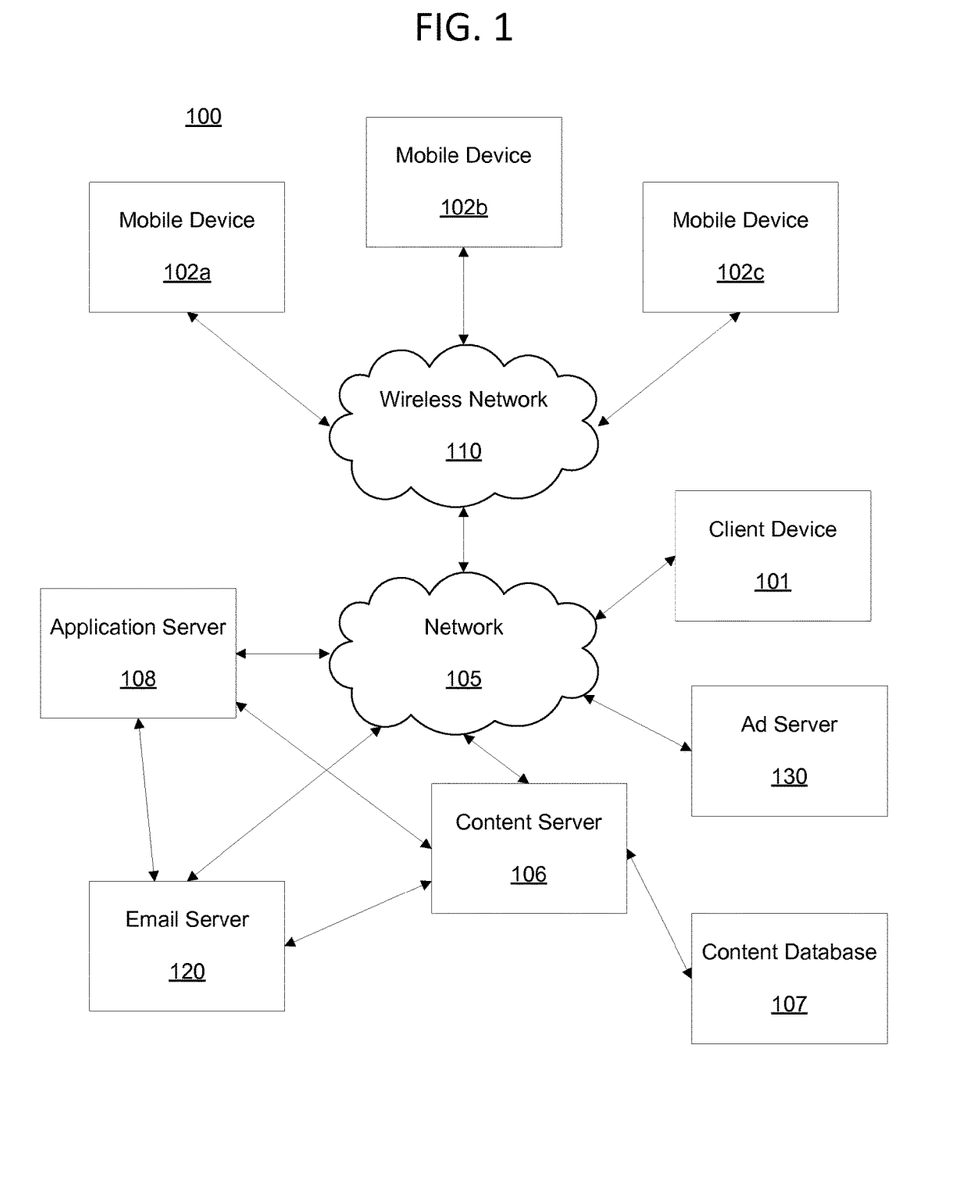
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102a-102c and client device 101. FIG. 1 additionally includes a variety of servers, such as content server 106, application (or "App") server 108, email server 120 and advertising ("ad") server 130.

One embodiment of mobile devices 102a-102c is described in more detail below. Generally, however, mobile devices 102a-102c may include virtually any portable computing device capable of receiving and sending a message over a network, such as network 105, wireless network 110, or the like. Mobile devices 102a-102c may also be described generally as client devices that are configured to be portable. Thus, mobile devices 102a-102c may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers including but not limited to watches and glasses, tablet computers, integrated devices combining one or more of the preceding devices, and the like. As such, mobile devices 102a-102c typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102a-102c also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102a-102c may uniquely identify themselves through any of a variety of mechanisms, including a phone number, Mobile Identification Number (MIN), an electronic serial number (ESN), device ID, or other mobile device identifier.

In some embodiments, mobile devices 102a-102c may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102c computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102a-102c and its components with network 105. Wireless network 110 may include any of a variety of wireless sub-networks that may further overlay stand-alone ad-hoc networks, and the like, to provide an infrastructure-oriented connection for mobile devices 102a-102c. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102a-102c with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102a-102c and another computing device, network, and the like.

Network 105 is configured to couple content server 106, application server 108, or the like, with other computing devices, including, client device 101, and through wireless network 110 to mobile devices 102a-102c. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, search services, calendar (e.g., scheduling) services, email services, photo services, web services, third-party services, audio services, video services, instant messaging (IM) services, SMS services, MMS services, FTP services, voice over IP (VOIP) services, or the like. Such services, for example, can include search services, whereby search results can be provided in accordance with an event trigger, as discussed in more detail below. In another example, email services and an email platform can be provided via the email server 120 in accordance with services provided by the content server 106. Examples of content may include search results, calendar reminders, images, text, audio, video, or the like, or some combination thereof, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102c. In some embodiments, applications, such as a photo-sharing or viewing application (e.g., Flickr®, Instagram®, and the like), can be hosted by the application server 108. Thus, the application server 108 can store various types of applications and application related information including application data and user profile information. In another example, email server 120 can host email applications and associated calendar information typically associated with a user's email account; therefore, the email server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
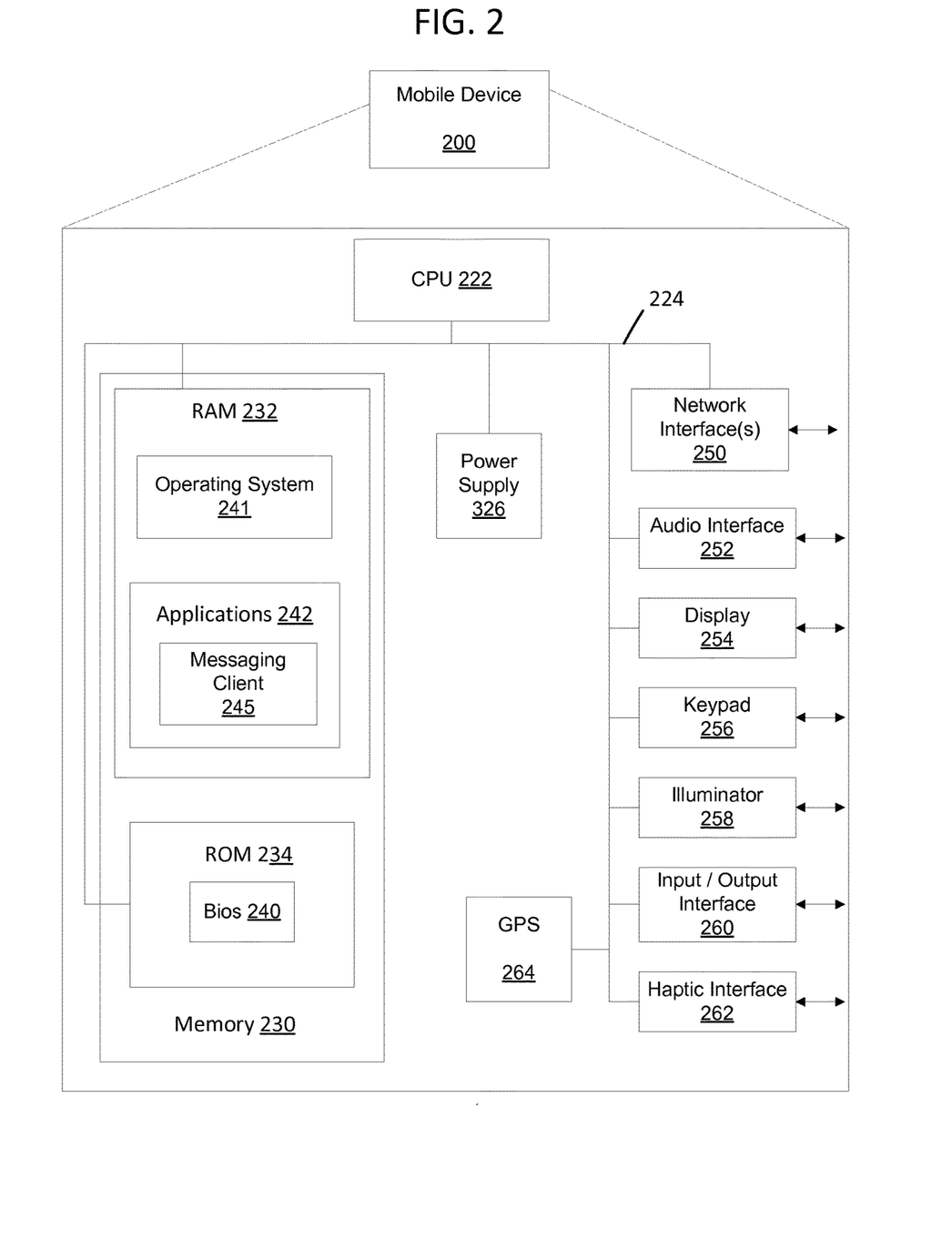
FIG. 2 is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described.

Figure 3:
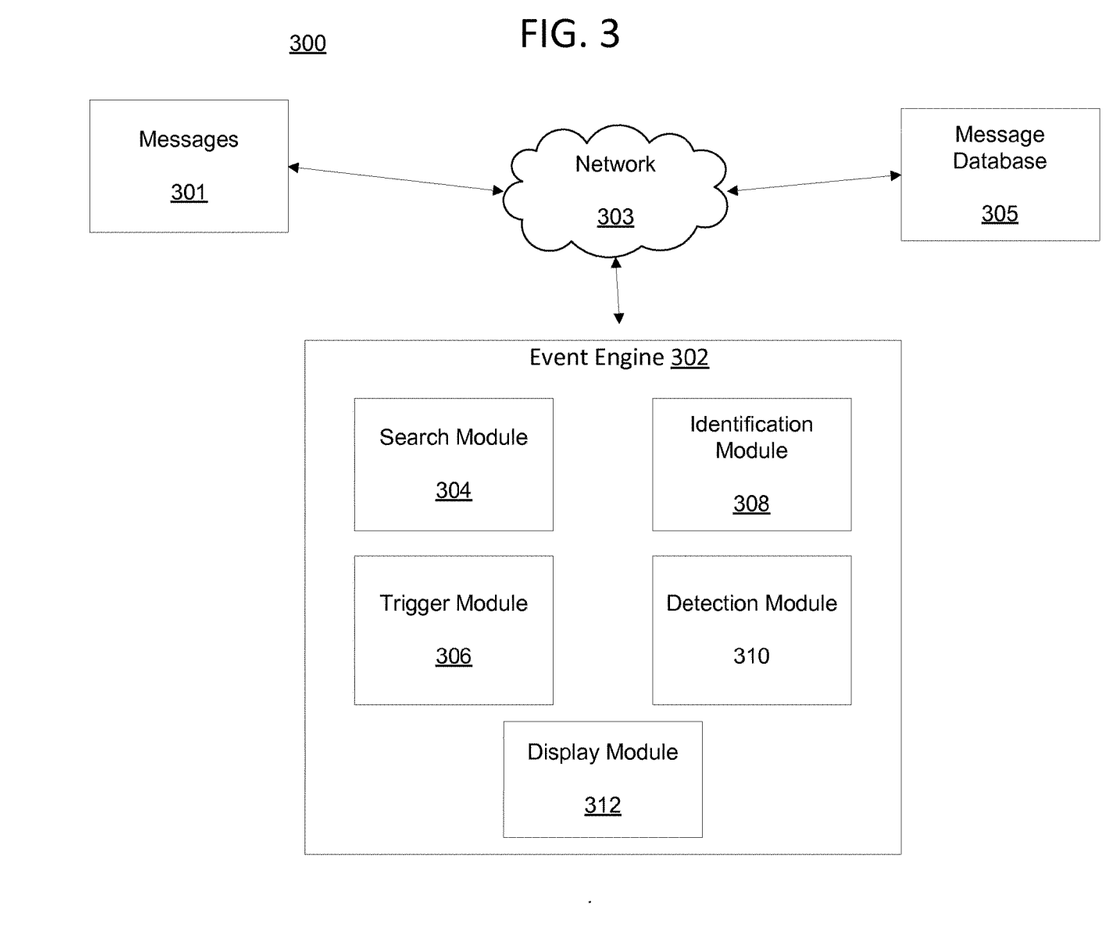
FIG. 3 is a schematic block diagram illustrating components of a system in accordance with embodiments of the present disclosure.

FIG. 3 is a block diagram illustrating the components of system 300 for performing the systems and methods discussed herein. FIG. 3 depicts an event engine 302 for delivering/displaying search results upon the determination of an event trigger and/or time-delay, as discussed herein. As understood by those of skill in the art, the display of search results can be provided via messages 301. The messages 301 that are provided to a user (e.g., displayed) may be hosted by a web server, content provider, application server, calendar provider, email service provider, ad server, a user's computing device, or any combination thereof. The types of messages 301 that display the event/event alert (comprising embedded search information) can be many different forms and/or any type of message. Examples of such messages can include, but are not limited to, calendar appointments/notifications, telephone call messages, email messages, HTML forms, SMS/MMS messages, Skype® messages, Twitter® messages and other social messages, word processing documents, help desk messages, portable document format (PDF) documents and/or other types of documents, and the like. In some embodiments, the messages 301 that will ultimately be displayed can be stored in a database 305 of stored messages, which can be associated with, for example, the content provider, such as Yahoo!®. For example, if a message is to be displayed at a certain time, and the message is associated with a trigger set in accordance with a user's calendar (e.g., Yahoo! Calendar®), the message may be stored in association with the email server associated with the Yahoo! platform. Such database 305 can be any type of database or memory that can store the messages 301 and associated message template information, as discussed above.

According to some embodiments, the display of the search information, provided as a message 301 to the user, can be provided in association with the type of event. That is, for example, if the event alert is set in accordance with a calendar event, the search results can be displayed via a displayed calendar reminder message 301. In some embodiments, the display of the search results can be displayed, despite being associated with an application/third party software, in a browser window, whereby upon detection of the event trigger, a browser window is displayed providing the search and/or search results message 301.

As discussed above, with reference to FIG. 1, the network 303 can be any type of network such as, but not limited to, a wireless network, a local area network (LAN), wide area network (WAN), the Internet, or a combination thereof. The network 303 facilitates connectivity between the messages 301, the event engine 302, and the database of stored resources 305.

The event engine 302 includes a search module 304, trigger module 306, identification module 308, detection module 310 and display module 312. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIG. 4, whereby the components of system 300 are implemented to perform the steps and processes of process 400.

Figure 4A:
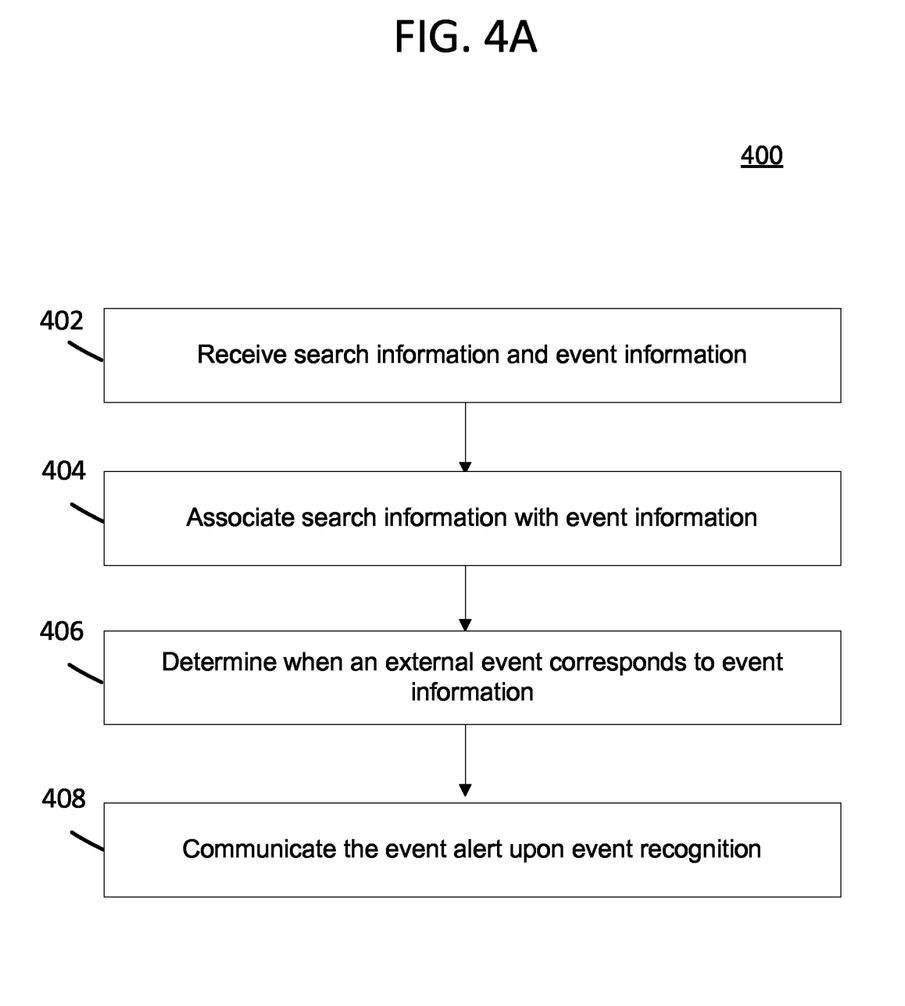
FIGS. 4A and 4B are flowcharts each illustrating steps performed in accordance with some embodiments of the present disclosure.
Figure 4B:
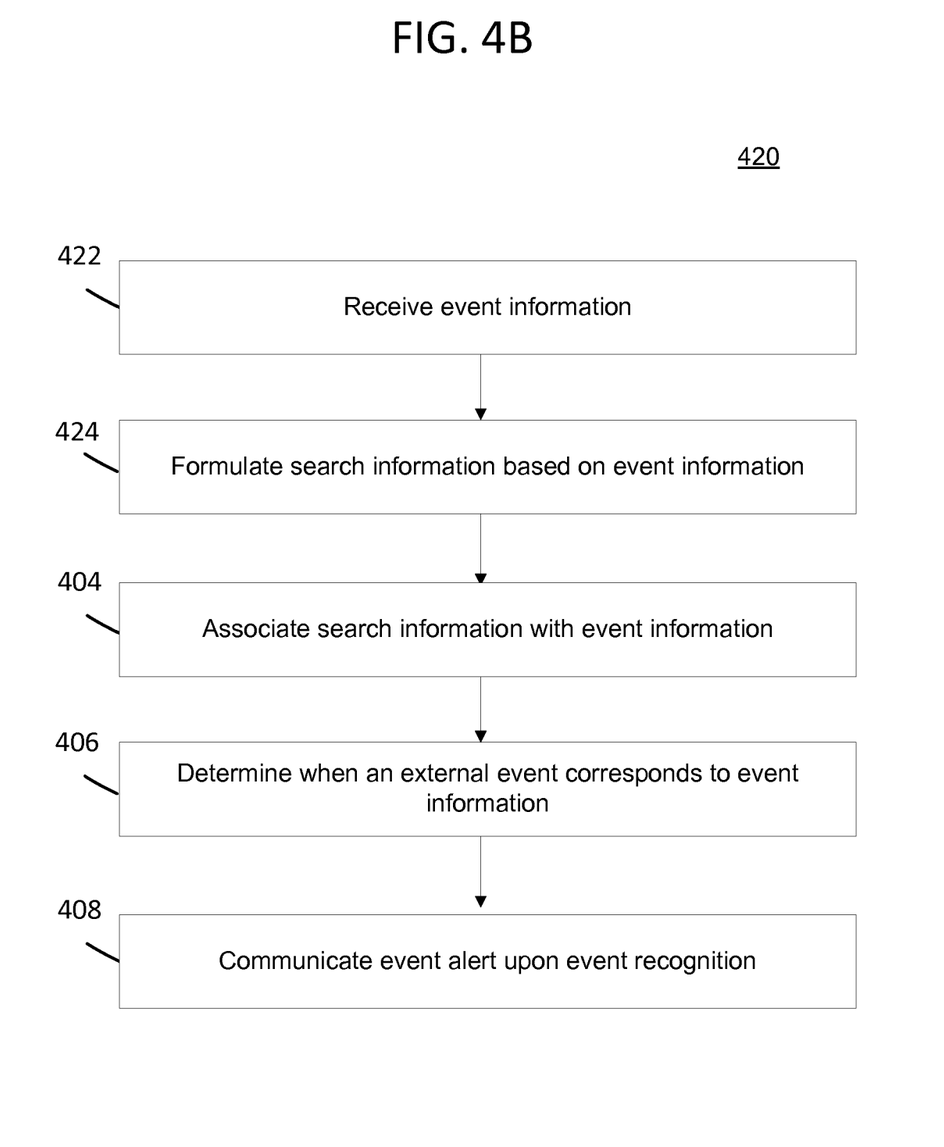

FIGS. 4A and 4B illustrate embodiments of process flows for performing the systems and methods discussed herein. As discussed above, the present disclosure involves displaying search results upon the occurrence or detection of an event. That is, a user's search query (or search result) can be linked (or embedded) in an event, such that upon satisfaction (or occurrence) of an event trigger corresponding to the event, the search query/result can be displayed in accordance with the event alert. As discussed above, embodiments exist where the search query can be performed prior to the event trigger's occurrence, such that upon the event occurring, the pre-cached search results can be displayed in accordance with the event display. In other embodiments, the search query can be received (and cached) and only performed upon the event trigger occurring, such that upon event detection (e.g., satisfaction of a rule associated with even trigger), the search query is invoked and the search is performed at the time of the event trigger, where the results can be displayed in accordance with the event alert. In some embodiments, the search query can be formulated based on event information.

Thus, as discussed herein, the disclosed systems and methods enable deferral of search information (i.e., search query and/or results) for later display in accordance with an event alert that is associated with an event trigger. As discussed below, the event trigger comprises at least one rule, which can be associated with the detection and identification of events satisfying the at least one rule. For example, the rule may be associated with spatial, temporal, logical or social activity identified or derived from a user's activity, or some combination thereof. Indeed, a user's activity may also comprise interest information, in that a user's interests may be derived from his/her observed and/or determined behavior and/or behavioral patterns.

FIG. 4A is a process 400 diagram illustrating steps performed in accordance with embodiments of the present disclosure. Process 400 begins with Step 402 where search information and the event information are received. In some embodiments, the search information and event information can be received in separate iterations, and in some embodiments, they can be received together. In some embodiments, the search information can be received then the event information can be received; and in some embodiments, the event information can be received, then the search information.

As discussed above, the search information, according to some embodiments, can include a search query or search results or both. The search query can include at least one character or an image, or any other type of content that can be searched via a search engine, as understood by those of skill in the art. The search query can also be resultant of an auto-population, as understood by those of skill in the art. The search result can be the result of a search query, which can be an auto-populated to produce a result without the need for a user to enter an action to actually execute the search and display results, as understood by those of skill in the art. Thus, embodiments exist, as discussed in more detail below, where Step 402 includes receiving a search query and/or receiving a search result. In some embodiments where the search result is received, a search query is performed and the results of such query are then provided. Step 402 can be performed by search module 304. That is, search module 304, which can be connected to or associated with a search provider/engine, can receive the search information.

According to some embodiments, the search information can be received from a user; such as, for example, upon a user entering a search query. In some embodiments, as illustrated in FIG. 4B, the search information can be performed by the event engine 302. That is, Process 420 includes receiving event information (Step 422), as discussed below, and formulating search information from the information comprised within, or inferred from the event information (Step 424). For example, upon a user arriving at a location, a search can be performed by the search module 302, without user input (or direct input), whereby a search can be performed respective information about, involving or surrounding the location. In some embodiments, a search can be suggested to a user (e.g., a suggested search query), allowing a user to approve or discard such search suggestion. In some embodiments, search information can comprise ad information for sponsored searches, as discussed in more detail below. In some embodiments, search information can appear in an alert as graphic or as a URL link or text link, or some combination thereof, providing the user the ability to perform an action respective the search information.

The event information can include, but is not limited to, spatial, temporal, logical or social data. The event information is associated with an event, which can be recorded, acknowledged and indicated via an application or third party program. For example, the event information can be associated with a specific time, specific location, task, activity (e.g., playing a sport, reading a webpage), and/or contact and/or planned contact (e.g., a meeting) with a specified person (e.g., from a user's contact list, as discussed above). Therefore, the event trigger can comprise an alert that displays an indication that an event has occurred. For example, it is understood that a user can set a calendar reminder for a specified time. For example, Bob sets a reminder to call his wife Jane at 8 pm in the evening for her birthday. The event would be set at 8 pm on Bob's calendar, which could be calendar software or a calendar application (e.g., Yahoo! Calendar®), as understood by those of skill in the art. The event information could comprise the context: that it is Jane's birthday, and to call her. The event trigger would occur at 8 pm. Therefore, at 8 pm on the day set by Bob, the event trigger could be recognized, whereby the event information is displayed in the event alert.

In some embodiments, as discussed above, the event trigger can comprise a time delay. That is, in addition to being set in accordance with a specific time, place and or activity, the trigger can be time delayed according to a preset time period, which can be set by the user, system as a whole, content provider, application and the like, and/or some combination thereof. In some embodiments, the event trigger can also include a rule, which dictates how the event alert is to be displayed, when it is to be displayed and on which (or type of) device it is to be displayed.

In some embodiments, in accordance with Process 400 and 420, a search query can be performed prior to the event trigger, and updated and/or aggregated with subsequent searches until the event trigger's occurrence. That is, after the collection of the search information and event information, in either form provided above respective Process 400 and/or 420, multiple searches may be performed during the period ranging from the creation of the event to the eventual display of the search results. Indeed, updating and/or aggregating of search results can be performed respective a predetermined time period or threshold. Thus, for example, the search query can be updated with aggregated search and interest information from the time the search is performed until the time the search is to be displayed, i.e., the event display. That is, according to some embodiments, multiple searches can be performed (and, in some embodiments, multiple search results collected) over a period of time between when an event is set and an external event triggers the event. In some embodiments, the multiple search results in such period can be analyzed to provide a visualization of how the results changed over that period. As such, as discussed in more detail below, upon displaying the search results, a visualization respective the updated/aggregated search results can be displayed to the user. In some embodiments, if the period between the event creation and the display of the search information exceeds a certain threshold, the query and trigger can be referred to a queue so that search results might be subject to further processing not capable of being performed immediately in response to a query, including, in some embodiments, a manual curation.

Process 400 and Process 420, from FIGS. 4A and 4B, respectively, each proceed in a similar manner after identification and collection of the event information and search information. That is, in some embodiments, as in Process 400, search information and event information can be received; whereas in Process 420, event information can be received, and search information is based on such event information. Thus, after these steps, Process 400 and 420 each proceed to steps 404-408, as discussed herein.

According to some embodiments, the event information, which comprises the event trigger information and search information, can be stored in a database. In some embodiments, the event information and the search information are stored in accordance with each other. In Step 404, the search information is associated with the event. That is, in some embodiments, the association of the search information can include, but is not limited to, embedding, linking, forming a part of, and the like, the search information with the event. In some embodiments, upon creation of the event (and in some embodiments, and upon indication by the user or system to associate the event with the search information) the search information is stored in association with the event. This can be stored in accordance with the software/program protocol providing the event. In some embodiments, this can also, or alternatively be stored in a database affiliated with the systems and methods providing the delayed search results display discussed herein (e.g., content provider, search provider, and the like). The creation, reception and embedding associated with the triggers can be performed by the trigger module 306.

According to some embodiments, event triggers can be implemented through embedding or logical connection to other objects, such as, but not limited to, calendar appointments, location coordinates, special event information, or contacts, and the like. For example, respective a user's contacts, whenever communication with that person is detected or they are present at a location associated with a user, a search could be invoked. Such embedding of the search information with the event enables search capabilities to be integrated with other applications. For example, search capabilities can be integrated with, for example, and not limited to, location detection or route maps, calendar data, to-do list data, email, phone calls, IMs, and the like, and some combination therefore, where search results can be embedded in context to an event based on user intent derived from the integrated application(s). In some embodiments, embedding may be resultant of a drag-and-drop of the search information to the created event alert.

In Step 406, each process determines when an external event corresponds to the event information. That is, it is determined when the event trigger occurs, such that the event is to be displayed. In some embodiments, such determination involves monitoring activities of a user to determine whether the event trigger has occurred. In other words, a user's activities are monitored. Such monitoring respective the external event can include, but are not limited to, tracking the location of the user, the time of day, which day it is, specific events/activity the user engages in, with whom the user interacts with, and the like. Such activity monitoring can be performed by the identification module 308. Indeed, the identification module 308 can also infer a user's activity and or intent to perform activities based on a collection of the user's activity (e.g., behavior information) stored in a user profile, or identification/determination of activities the user is currently performing. Based on such monitored activity, which can occur in substantial real-time, or periodically with deference to event trigger information, determinations are made regarding whether an event trigger is recognized. That is, the event engine 302, through the detection module 310, compares the results of the monitoring (from module 308) with the user's activities (from module 306). Upon an event occurring, or the event trigger being detected, event data as an event alert is communicated to the user. Step 408. As discussed above, the event alert is associated with the event trigger and comprises embedded search information. Therefore, upon the event trigger being triggered (i.e., the rule associated with the event being satisfied, as discussed above), the event alert is communicated to the user, whereby along with the event information, the embedded search information is also displayed to the user. Step 408 can be performed by the display module 312. Thus, for example, search information can be provided by a user on a desktop computer, and subsequently displayed on the user's mobile device upon the event alert being displayed on the device at satisfaction of the rule associated with the event trigger.

Thus, the disclosed systems and methods implementing Processes 400 and 420 provide the ability to create a time or event triggered search query and/or a time or event triggered search result, where query/results are directly actionable in accordance with a user's activity. The present disclosure allows users to defer searches to times or contexts when they are most relevant or convenient. Additionally, another advantage provided by the disclosed systems and methods includes the ability to seamlessly integrate search into other applications where it has previously not be integrated and was run as a completely independent process.

Figure 5:
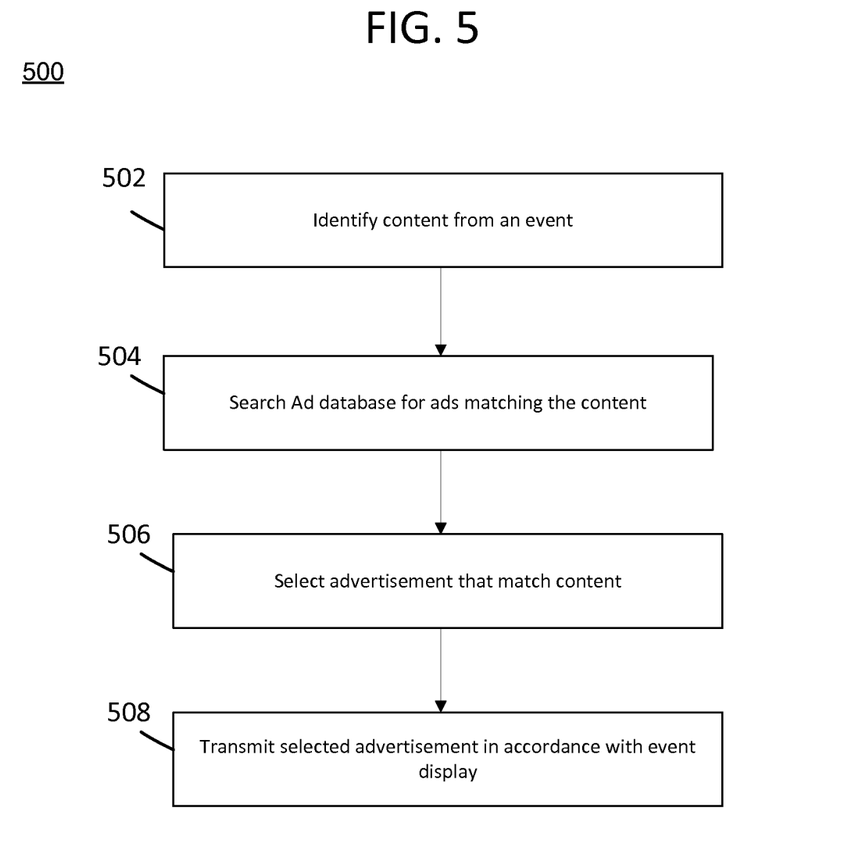
FIG. 5 is a flowchart illustrating steps performed in accordance with some embodiments of the present disclosure.

FIG. 5 includes a Process 500 for serving relevant advertisements based on the content of an event. Specifically, FIG. 5 illustrates how advertisements are served in accordance with event alerts. That is, ads can be based on the specific content derived from the event alert. The derived content can be associated with the search information (i.e., search query or search result) or the event information, or some combination thereof. Indeed, any and all types of event and search information, as well as information forming the basis for such event and search information, as discussed above, can form the basis for such content.

In Step 502, content from an event alert is identified and/or extracted from the event. That is, content, or a type of content, associated with the event forms a basis for a context for serving advertisements having a similar context. As discussed above, such content can be based upon, but is not limited to, information derived/identified/inferred from the event and/or the search information. In Step 504, the content (or content data) is communicated (or shared) with an advertisement server 130. Upon receipt of the content data, the advertisement server 130 performs a search for a relevant advertisement within an associated advertisement database. The search for an advertisement is based at least on the extracted content.

In Step 504, the advertisement server 130 searches the advertisement database for advertisements that match the identified (and extracted) content. In Step 506, an advertisement is selected (or retrieved) based on the results of Step 504. In some embodiments, the advertisement can be selected based upon the result of Step 504, and modified to conform to attributes of the event display within which the advertisement can be displayed, and/or to the device for which it will be displayed. In some embodiments, as in Step 508, the selected advertisement is shared or communicated via the application/platform that displays the event. In some alternative embodiments, the selected advertisement is sent directly to each user's computing device. Thus, in conjunction with the above discussion, the selected advertisement is shared/communicated upon the event information (and comprised search information) being visibly displayed to the user (in the user's event providing program). In some embodiments, the steps of Process 500 can be performed prior to the event trigger being recognized, whereby the advertisement can be pre-cached along with the search information (and event information), and displayed upon display of the event alert.

For example, Bob performs a search for flowers to send to his wife for her birthday. At the 8 pm, the event alert is displayed. As discussed above, the search results are displayed, and in some embodiments, as discussed herein, an advertisement will also be displayed. The advertisement can be associated with local flower stores for which Bob may purchase flowers. The information forming the basis for the flower ads can be based on, for example, the search for flowers, the search results of the flowers, the event information indicating it was his wife's birthday, Bob's location (current location, home address or location at time of the event creation), Bob's prior purchase history, and/or any combination thereof.

As discussed above, some advertisement models can include advertisers paying fees based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

In some embodiments, in addition to event information and search information, advertisement information may be logged in a recording database. Such logging can be performed to determine the performance of such information—related to the frequency and duration users' view such advertisements and/or information associated with such events and searches. Thus, such information can be utilized for tracking and enabling differential billing/fee structures for types of content. That is, particular content for advertisements (or specific types of ads) may be offered at premium prices due to the metrics associated with the advertisement delivery and/or performance. In some embodiments, the billing/fee structure for types of ads may be contingent upon information surrounding or comprised within an event and/or search, including, but not limited to, the temporal data (time or day of the event and/or search), spatial data (location of the event or search), and social data (person or persons, parties or entities involved or associated with the event or search), and the like, and/or some combination thereof. For example, if the day is Mother's Day, and the search is for flowers, serving advertisements for flowers may carry a premium fee for the day or days leading up to Mother's Day. Thus, the billing/fee structure for ads can be based upon a type of event, a type of search result, or type of ad that is selected pursuant to the event information and embedded search information, as discussed above.

Figure 6:
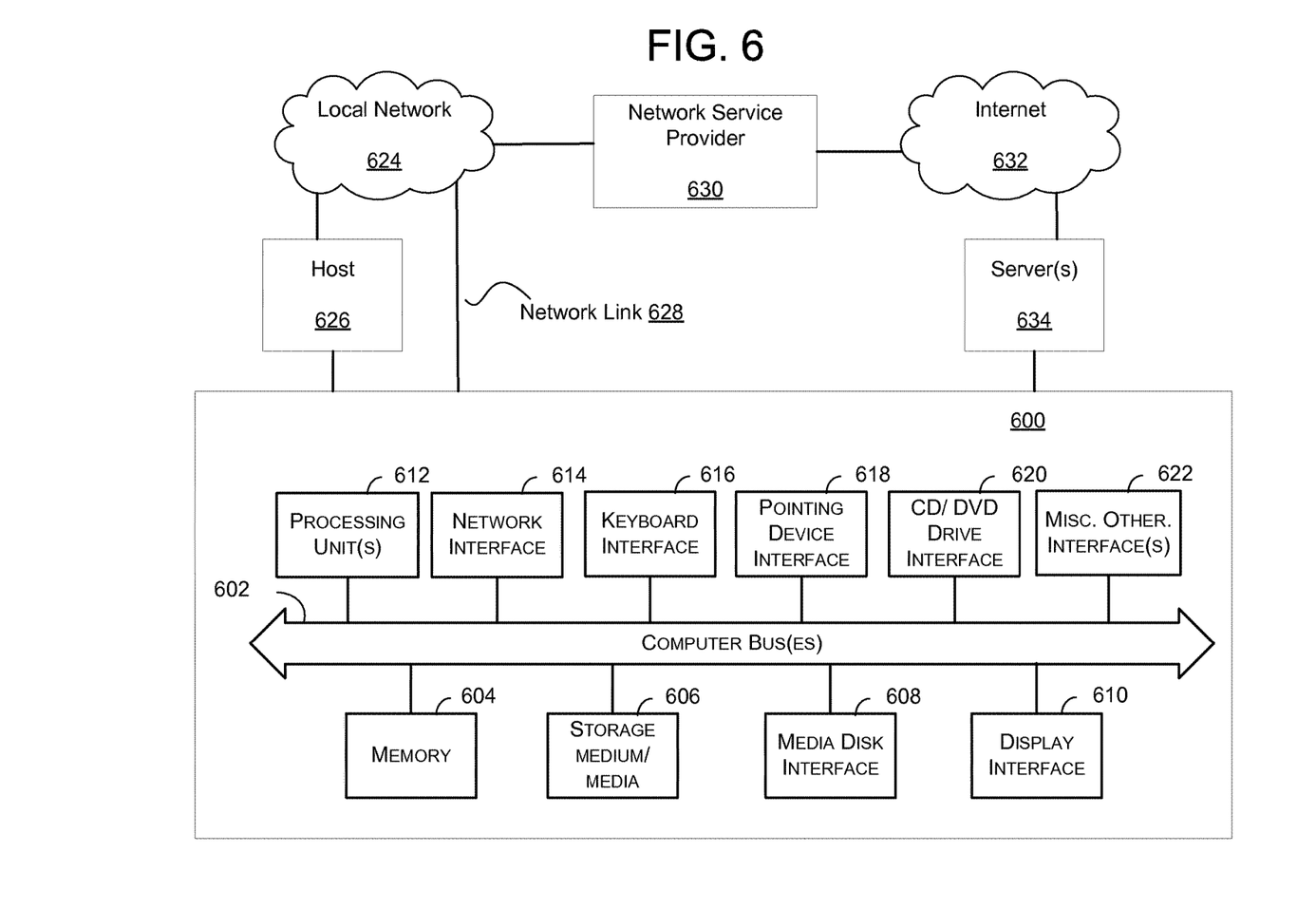
FIG. 6 is a block diagram illustrating architecture of a hardware device in accordance with one or more embodiments of the present disclosure.

As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device, search information and event data, said event data comprising a trigger indicating an event associated with a user, said search information comprising data associated with a search for digital content and a result of the search for the digital content;
   associating, via the computing device, the search information with the event data, said association comprising embedding said search information with said event data;
   storing, in a memory, the event data;
   determining, via the computing device, a context associated with said stored event data;
   searching, via the computing device, a database associated with a third party content provider for a digital media item matching said context;
   determining, via the computing device, when an external event corresponds to the event data; and
   based on said determination, communicating the event data and the digital media item to the user, said communication of the event data causing the embedded search information to also be communicated to the user.

2. The method of claim 1, wherein said search information is received from the user.

3. The method of claim 1, wherein said external event comprises an activity of said user.

4. The method of claim 1, wherein said external event comprises temporal data.

5. The method of claim 1, wherein said external event is a future event.

6. The method of claim 1, wherein said search information corresponding to the search for digital content comprises a search query.

7. The method of claim 6, wherein said communication further comprises performing said search query to produce search results upon detection of the external event.

8. The method of claim 6, further comprising:
   performing, via the computing device, said search query to produce said search results, said performing occurring upon reception of said search information, wherein said associated search information comprises said search results.

9. The method of claim 1, wherein said communication of the stored event data is communicated to said user in accordance with an application, said search information caused to be displayed within a window associated with the application.

10. The method of claim 1, further comprising:
    determining a fee structure for said digital media item based on said event data.

11. The method of claim 10, wherein said fee structure is based upon a type of event that triggers said communication.

* * * * *